(No Model.)
A. S. CARTWRIGHT.
TIRE VALVE.
No. 603,941. Patented May 10, 1898.
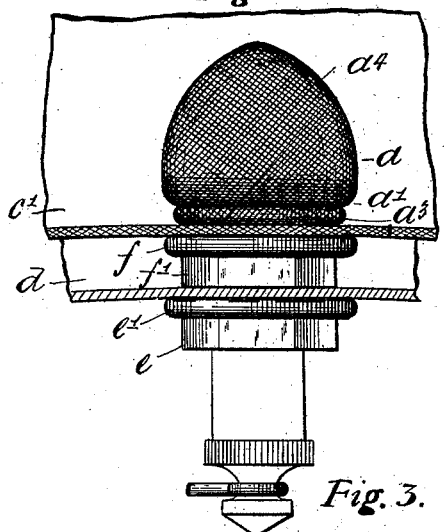
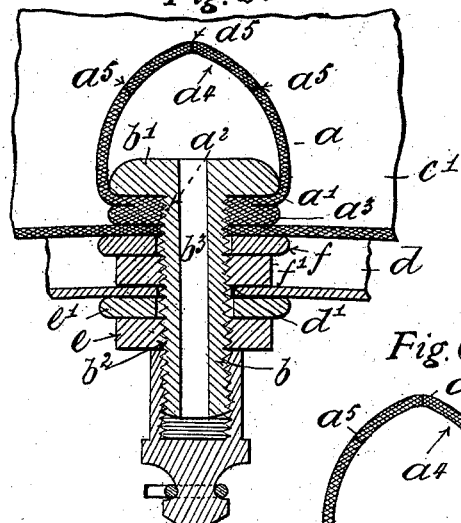
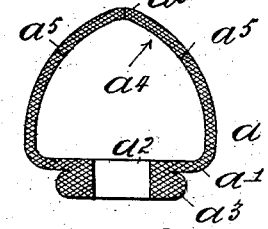
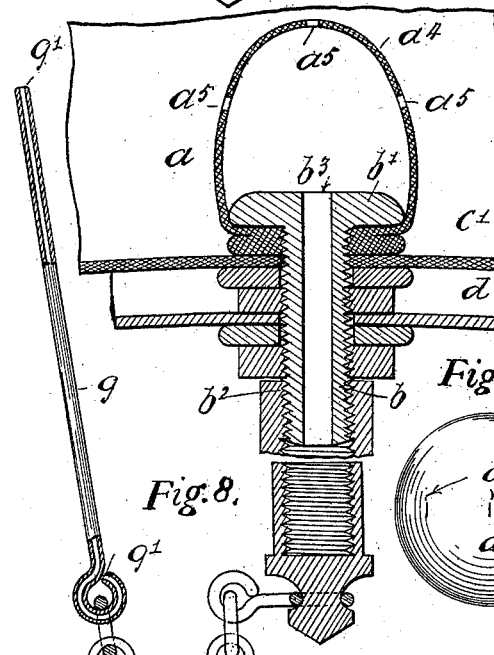
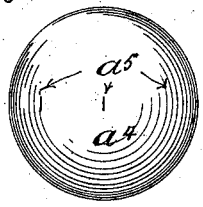
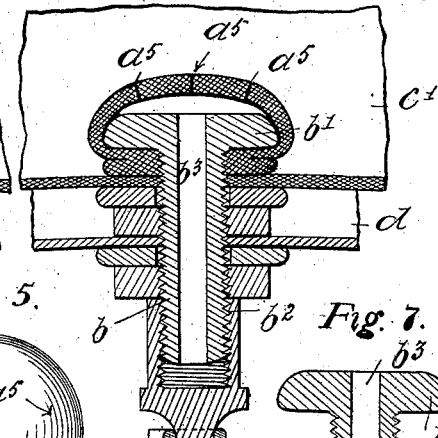
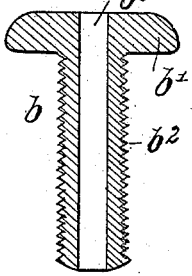
WITNESSES
INVENTOR
Aaron S. Cartwright
BY James L. Norris
ATTY

UNITED STATES PATENT OFFICE.

AARON SMITH CARTWRIGHT, OF BIRMINGHAM, ENGLAND.

TIRE-VALVE.

SPECIFICATION forming part of Letters Patent No. 603,941, dated May 10, 1898.

Application filed October 4, 1897. Serial No. 654,023. (No model.) Patented in England July 29, 1897, No. 17,762.

*To all whom it may concern:*

Be it known that I, AARON SMITH CARTWRIGHT, manufacturer, a subject of the Queen of Great Britain, residing at 75 Ford street, Hockley, in the city of Birmingham, England, have invented certain new and useful Improvements in Tire-Valves, of which the following is a specification, and for which invention I have obtained Letters Patent of Great Britain, dated July 29, 1897, and numbered 17,762.

This invention relates to valves for inflatable articles, but principally for pneumatic tires, and has for its object to produce a simple and efficient valve having but few parts, none of which are liable to become deranged by use, whereby the said valves are cheaply made and easily produced.

Figure 1 of the accompanying drawings represents an elevation of one form of my improved tire-valve shown applied to a tire and wheel-rim. Fig. 2 represents a vertical section of Fig. 1. In these two views the valve is shown in its normal condition—*i. e.*, with the piercings in the same closed only by the elasticity of the walls of the said valve, which is uninfluenced either by external air-pressure or by the internal pressure of the compressed air within the tire. Fig. 3 represents a like vertical section of the valve as Fig. 2, but showing the rubber or elastic part of the same distended or dilated as it would be during the forcing of air through the valve into the tire by an inflator or pump. Fig. 4 is another like sectional view as the preceding figures, but showing the valve in the position it assumes on the tire being inflated to a maximum, when the greatly-compressed air then converges or exerts itself centripetally upon the outside of the elastic walls of the valve, which in consequence of being unsupported interiorly is bodily contracted or squeezed up, thereby further closing up or sealing the piercings in the same and effectually preventing or checking the escape of air. Fig. 5 represents a plan of the said valve separately, and Fig. 6 is a vertical section of the same. Fig. 7 represents a vertical section of the stem or metallic body part of the valve separately. Fig. 8 represents the attachment or instrument employed for opening the valve to deflate the tire.

The same letters of reference indicate corresponding parts in the several figures of the drawings.

According to this form of my invention the valve $a$ is made from india-rubber or other elastic material and of the figure of a dome or of a beehive shape, with the edges $a'$ of the walls at the open end $a^2$ turned inward, so as to form a foot or flange $a^3$, or, in other words, I gather in or throttle the said elastic valve at the mouth, which then takes over and comes under the head or circular-flanged end $b'$ of a metal or like body $b$, which preferably is wormed exteriorly at $b^2$ and has a hole $b^3$ up its middle leading into the interior of the elastic dome, which is located inside the air-tube $c'$ of a tire, while the stem comes upon the outside thereof and passes through a hole $d'$ in a rim $d$, to which it is affixed by a screwed-on nut $e$ and washer $e'$ in the ordinary way.

The crown $a^4$ of the dome-shaped rubber valve has one or more small closing-piercings $a^5$, (or one or more elongated incisions,) which is or are normally closed by the elasticity of the walls of the said valve only, but are further and more perfectly closed or sealed by the concentrated centripetal back pressure of the compressed air within the air-tube exerting itself upon the outside walls of the valve.

A sound or air-tight joint is made between the mouth end of the valve and the flanged head of the valve-stem, located within the interior of the said valve, by a washer $f$ or washers threaded upon the screwed stem of the said body and gripping, by means of a screwed-up nut $f'$, the turned-under edge of the valve between itself and the under side of the head of the stem.

A separate deflating device may be employed in the form of a small tube $g$, open at both ends $g'$, as represented in Fig. 8, or it may be closed at the fore end and have a small hole or entrance in the side and which when passed axially up the stem comes opposite to and passes through and fully expands one of the piercings or slits in the valve and so allows air to escape or pass out of the tire.

The forcing of air into the valve from the outside forcibly distends the walls of the same and opens the piercings or incisions or causes them to gape; but immediately outside pressure is relieved the compressed air within the tire exercises itself against the outside rubber walls of the valve, compresses the same, closes the slits, and so checks or prevents the escape or exit of air.

It is understood that the holes in the valve are closed solely by the elasticity of their walls and the centripetal pressure of the air in the tire without the material surrounding the said holes having to bed or seat itself upon any surface.

Having fully described my invention, what I desire to claim and secure by Letters Patent is—

1. The combination with a pneumatic tire, of a valve therefor, comprising a hollow stem having a head at one end located within the tire, an elastic dome or chamber inclosing said head but normally lying out of contact with the face thereof to provide an intervening air-space, and having a contracted mouth which surrounds the hollow stem adjacent to the said head, slits or incisions in the elastic dome or chamber, the lips of said slits or incisions being normally held closed by the back pressure of air within the tire and opened by distending the dome, and clamping-nuts arranged upon the stem and adapted to clamp the parts together and to the tire, substantially as described.

2. The combination with a pneumatic tire, of a valve therefor comprising a hollow exteriorly-threaded stem having a head at one end located within the tire, an elastic dome or chamber inclosing said head and having a contracted mouth located between the head and tire, said dome or chamber being provided with slits or incisions which are opened by the act of inflating the tire and the lips of said incisions normally held closed by the elasticity of the walls of said chamber and by the back pressure of air within the tire, alternately-arranged nuts and washers screwed upon the hollow stem to clamp the valve to the tire, a screw-cap for the end of the hollow stem, a deflating-tube having openings in its opposite ends and adapted to pass up into the hollow stem to distend the elastic dome for the purpose specified, and a chain connection between the said screw-cap and deflating-tube.

In testimony whereof I have hereunto set my hand in presence of two subscribing witnesses.

AARON SMITH CARTWRIGHT.

Witnesses:
 HENRY SKERRETT,
 WILLIAM H. LONG.